United States Patent Office 3,578,516
Patented May 11, 1971

3,578,516
HIGH ENERGY FUEL COMPRISING BERYLLIUM HYDRIDE AND PENTABORANE
Robert N. Sanders, Baton Rouge, La., assignor to Ethyl Corporation, New York, N.Y.
No Drawing. Filed Aug. 6, 1968, Ser. No. 752,731
Int. Cl. C06b 21/00
U.S. Cl. 149—22
10 Claims

ABSTRACT OF THE DISCLOSURE

Heterogeneous compositions, stable against sedimentation, are made by suspending an insoluble solid component in a liquid mixture of two components, one more and the other less dense than the solid component, in such proportions that the density of the liquid mixture approximates closely that of the solid component. Exemplary compositions are suspensions of beryllium hydride in (1) 82 volume percent pentaborane, 18 volume percent trimethylaluminum, and (2) 93 volume percent pentaborane, 7 volume percent decaborane.

BACKGROUND OF THE INVENTION

This invention relates to a process for the preparation of suspensions, stable against sedimentation, of a solid phase or phases in a liquid phase. More particularly, in the field of high energy fuels, it relates to fuels which are relatively highly stable against sedimentation, the preparation of which involves no significant specific impulse penalty as compared with fuels of lower sedimentation stability.

It is known in organic analytical practice to determine approximately the density of an unknown sample by bracketing the same with a liquid of greater density in which the sample tends to rise to the surface and a liquid of lesser density in which the sample tends to sink. Standards of intermediate density can be prepared by mixing pure standard liquids in predetermined proportions.

It is also known in the field of oil well drilling muds to prevent the chips formed by drilling from settling around the drill and clogging or chipping the cutting edge thereof by matching approximately the density of the mud to that of the chips. This is done by adding a finely divided solid such as bentonite or barium sulfate to the drilling fluid to alter the bulk density thereof.

These prior art procedures did indeed produce liquid mixtures having bulk densities approaching a desired value. However these mixtures were unstable to sedimentation and the solid components separated fairly rapidly from the suspension medium. Indeed, the above applications did not require a high degree of sedimentation stability. In the field of high energy fuels, to which the present invention is primarily directed, there is a definite need for suspensions wherein the solids will remain suspended over relatively long periods of time.

Accordingly, it is an object of the present invention to produce suspensions of solids in liquids which shall be stable against sedimentation for relatively prolonged periods of time.

Another object of this invention is to produce suspension liquids of predetermined densities essentially equal to the density of the solid to be suspended therein by mixing appropriate liquids of different densities in amounts precalculated to produce the mixture having the desired density.

A particularly preferred object of this invention is to prepare suspensions which exhibit relatively high stabilities against sedimentation and in which both the continuous and the discontinuous phases are characterized by high specific impulse.

Other objects will appear hereinafter.

SUMMARY OF THE INVENTION

In its broadest embodiment the present invention provides a process for producing a suspension, highly stable against sedimentation, of a solid substance in a liquid wherein the solid is substantially insoluble. This process comprises suspending the foregoing solid substance in a homogeneous liquid mixture comprising first and second components, one of which is of higher density and the other of lower density than the solid substance, the first component being liquid over a temperature range of at least about 50° C. and the second component being a liquid or solid which is substantially soluble in the first component at temperatures in the above range. The above components are combined in such proportions as to produce a homogeneous liquid mixture having, at temperatures in the foregoing range, a density substantially equal to that of the above solid substance.

Another embodiment of this invention is the production, by the above procedure, of a suspension stable against sedimentation wherein both the solid to be suspended and the components of the liquid suspension medium are characterized by high specific impulse.

DESCRIPTION OF THE PREFERRED EMBODIMENTS

A preferred embodiment of this invention is the process of mixing solid beryllium hydride with a liquid mixture of pentaborane and decaborane to provide a stable suspension of high specific impulse.

Another preferred embodiment is the process of mixing solid beryllium hydride with a liquid mixture of pentaborane and trimethylaluminum to produce a stable suspension of high specific impulse.

A particularly preferred embodiment of this invention is the process of mixing solid beryllium hydride of a density in the range of from about 0.62 to about 0.66 gram per cc., with a homogeneous liquid mixture compriing from about 92 to about 94 percent by volume of pentaborane and from about 6 to about 8 percent by volume of decaborane. This embodiment is preferred because the cited components, beryllium hydride, decaborane and pentaborane, yield fuels of very high specific impulse when combined with a standard oxidizer such as hydrogen peroxide, and because beryllium hydride of the given density range is readily obtained in the purity required for the indicated use. Other embodiments will appear hereinafter.

The compositions produced by the process of this invention exhibit a number of distinct advantages over those hitherto employed in high energy fuels. As indicated above, the process minimizes the rate of separation of beryllium hydride or other discontinuous phase in slurries without introducing any new adverse affect on storage capability. It improves the density of pentaborane mixtures without significantly lowering the specific impulse of the resulting fuel system, since both the continuous and discontinuous phases are characterized by high specific impulse. Furthermore, owing to the equalization of the densities of the continuous and discontinuous phases there is no driving force for separation. Consequently, the addition of gelling agents is not required, as it has been in the past, to produce a stable system, provided the variations in ambient temperature are small enough to result in negligible (of the order of a few percent) changes in the density of the liquid suspension agent. Where, for any reason, density equalization is not complete the addition of a minimum amount of gellant may be desirable but,

3 owning to the small density differential, any gel which is formed is subjected to a minimum of strain. Thus, whether or not a small amount of gellant is required, the process of the invention leads to a stable suspension.

The invention will be more fully understood by reference to the following examples.

Example 1

Thitry-four parts by volume of decaborane are mixed with 466 parts of pentaborane, and the mixture is shaken vigorously. The decaborane dissolves immediately. Amorphous beryllium hydride (269 parts by weight) of a density of 0.64 gram per cc. is added. The system is thoroughly mixed and left standing in a thermostat at 90° F. Examination after a lapse of 4 hours shows no perceptible settling of the hydride.

When the procedure of the above example is repeated using 410 parts of pentaborane and replacing the decaborane with 90 parts of trimethylaluminum, similar results are obtained.

When the procedure of the above example is repeated using 345 parts of decaborane, 155 parts of pentaborane and 269 parts by weight of beryllium hydride of a density of 0.84 gram per cc. (obtained by compacting at elevated temperature as described in copending application Ser. No. 392,677, filed Aug. 24, 1964), similar results are obtained.

Examples 2–5

The following table presents other liquid mixtures of high specific impulse which are useful and stable suspension agents for beryllium hydride of a density of about 0.64 gram per cc.

| | Component "A" | Component "B" | Percent of component "A" (by volume) |
|---|---|---|---|
| Example: | | | |
| 2 | Pentaborane | Diethylaluminum hydride | 87 |
| 3 | do | Triethylaluminum | 90 |
| 4 | do | Triethylborane | 70 |
| 5 | do | Hydrazine diborane | 91 |

The present invention, in part because of the simplicity of its underlying concept, has a very wide range of application. Thus, in the broadest sense, any combination of two substances which can be mixed to form a homogeneous liquid can function as a suspension agent for a third component which is a solid chemically inert with respect to, and substantially insoluble in, the liquid mixture of the first two components. This suspenion will be stable to sedimentation provided the components of the liquid suspension agent are, respectively, higher and lower in density than the solid to be suspended and provided that the components are combined in such proportions as to yield a liquid of substantially the same density as the solid to be suspended.

Furthermore, if it is desired to prepare, not a stable suspension, but one which settles at a uniform predetermined rate, this can be achieved by a suitable choice of the proportions of the components of the liquid suspension agent.

From a more limited and more practical viewpoint, any liquid or solid of high specific impulse which is soluble in pentaborane, is more dense than beryllium hydride and is unreactive with either pentaborane or beryllium hydride, can be used in suitable proportions with beryllium hydride as a high energy fuel stable against sedimentation. This represents a highly important utility in the preparation of jet and rocket fuels. For example, higher polyboranes could be combined with pentaborane to form a stable suspension with beryllium hydride.

The density of the mixed suspension media will, of course, vary with the temperature at which they are used.

4

Consequently, it becomes necessary to tailor the proportions of the components of the suspension medium to the temperature at which the medium is to be used. In general, for a given temperature and assuming ideality of the suspension solution, the percent by volume of the higher density component in a suspension medium of density equal to that of the solid to be suspended is given by the expression $$\frac{100(D_S - D_{C_2})}{D_{C_1} - D_{C_2}}$$

wherein $D_S$ is the density of the substance to be suspended. $D_{C_1}$ the density of the suspension component of higher density, and $D_{C_2}$ the density of the suspension component of lower density. Thus, in Example 1 above, $s$ would represent beryllium hydride, $C_1$ decaborane, and $C_2$ pentaborane.

I claim:

1. Process for producing a suspension of a high-energy fuel of enhanced stability against sedimentation which comprises suspending beryllium hydride in a homogeneous liquid mixture comprising first and second components of high specific impulse, said first component being pentaborane, said second component being of higher density than the beryllium hydride and being a liquid or solid exhibiting substantial solubility in said first component, and said first and second components being combined in such proportions as to produce a homogeneous liquid mixture having, a density substantially equal to that of the beryllium hydride.

2. The process of claim 1 wherein said second component is decaborane.

3. The process of claim 1 wherein said second component is trimethylaluminum.

4. The process of claim 1 wherein said beryllium hydride has a density of approximately 0.62 to 0.66 gram per cc., said homogeneous liquid mixture comprises from about 92 to about 94 percent by volume of pentaborane and from about 6 to about 8 percent by volume of decaborane.

5. The process of claim 1 wherein said beryllium hydride has a density of approximately 0.62 to 0.66 gram per cc., said homogeneous liquid mixture comprises from 81 to 83 percent by volume of pentaborane and from 19 to 17 percent by volume of trimethylaluminum.

6. A high-energy fuel of enhanced stability against sedimentation which comprises, a suspension of beryllium hydride in a homogeneous liquid mixture comprising first and second components of high specific impulse, said first component being pentaborane, said second component being of higher density than the beryllium hydride and said second component being a liquid or solid exhibiting substantial solubility, in said first component and said first and second components being combined in such proportions as to produce a homogeneous liquid mixture having a density substantially equal to that of the beryllium hydride.

7. The component of claim 6 wherein said second component is decaborane.

8. The component of claim 6 wherein said second component is trimethylaluminum.

9. The composition of claim 6 wherein said solid substance is beryllium hydride of a density of approximately 0.62 to 0.66 gram per cc., said homogeneous liquid mixture comprises from about 92 to about 94 percent by volume of pentaborane and said second component is decaborane in the amounts of from about 8 to about 6 percent by volume.

10. The composition of claim 6 wherein said solid substance is beryllium hydride of a density of approximately 0.62 to 0.66 gram per cc., said homogeneous liquid mixture comprises from about 81 to about 83 percent by volume of pentaborane and said second component is trimethylaluminum in an amount of from about 19 to about 17 percent by volume.

References Cited

UNITED STATES PATENTS

| | | | |
|---|---|---|---|
| 2,994,191 | 8/1961 | Hamilton | 149—22X |
| 3,006,743 | 10/1961 | Fox et al. | 149—22X |
| 3,062,856 | 11/1962 | D'Alelio | 149—22 |
| 3,070,472 | 12/1962 | Drummond | 149—22 |
| 3,221,494 | 12/1965 | Chu | 149—22 |
| 3,351,505 | 11/1967 | Shapiro et al. | 149—22X |
| 3,392,068 | 7/1968 | Knowles et al. | 149—22X |

BENJAMIN R. PADGETT, Primary Examiner

S. J. LECHERT, JR., Assistant Examiner

U.S. Cl. X.R.

149—87, 109